Patented July 30, 1946

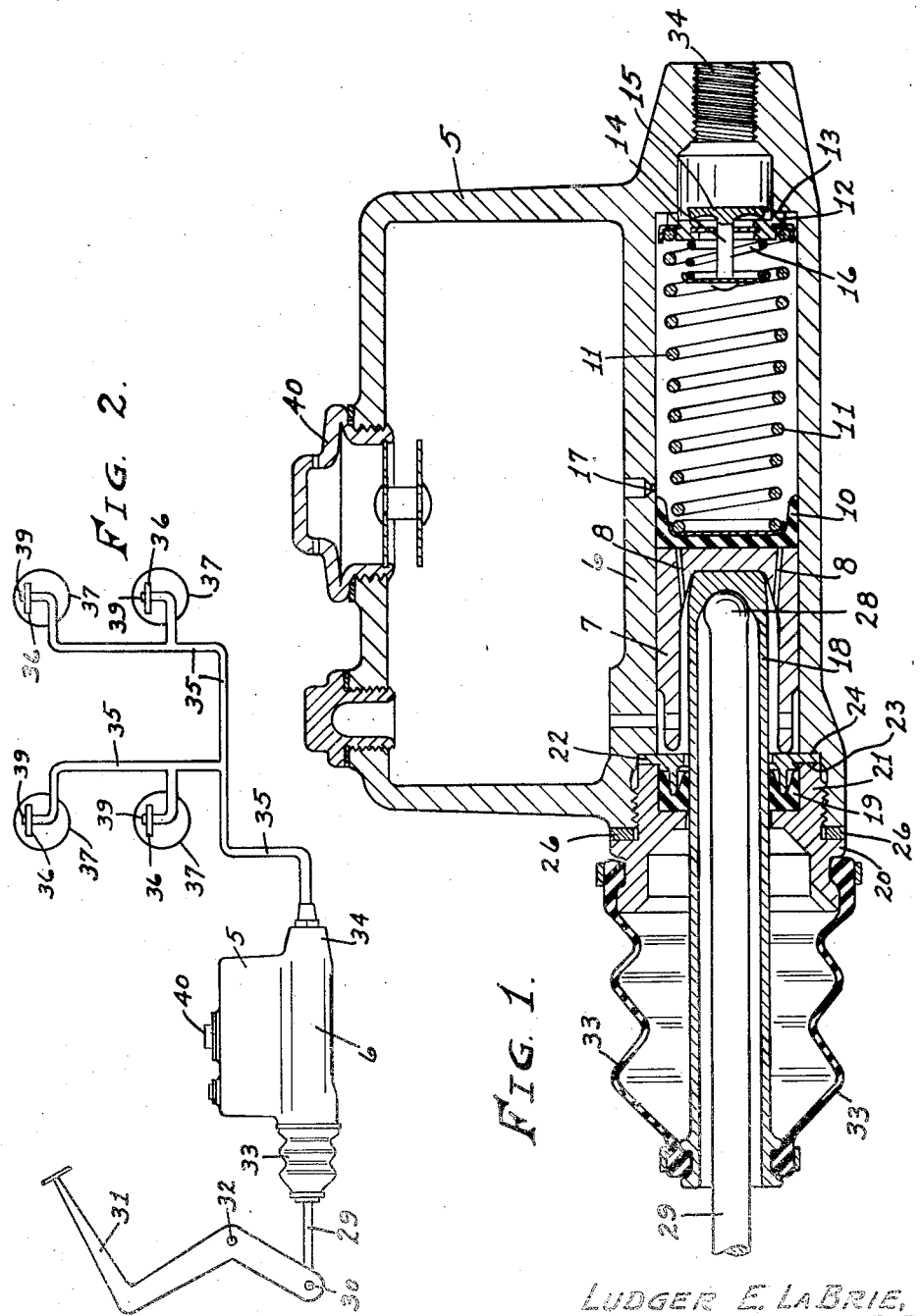

2,405,093

UNITED STATES PATENT OFFICE 2,405,093

MASTER CYLINDER AND RESERVOIR

Ludger E. La Brie, Detroit, Mich., assignor to Hydraulic Brake Company, Detroit, Mich., a corporation of California Application January 29, 1945, Serial No. 575,136

1 Claim. (Cl. 60—54.6)

My invention relates to a master cylinder and reservoir for hydraulic brake systems.

The object of my invention is to improve the type of combined reservoir and cylinder in which the cylinder and reservoir are integrally cast, and in which one end of the cylinder is in constant communication with the fluid of the reservoir through an opening between the reservoir and the end of the cylinder, and in which the end of the cylinder is in constant communication with the interior of a hollow piston mounted in the cylinder.

A further object of my invention is to provide a hollow piston rod which is guided at one end by the piston and at an intermediate position along the piston rod by a rubber cup washer held in a cylinder head which serves to close the open end of the cylinder. The structure thus provided permits the piston rod to reciprocate through the cylinder head in exact alignment with the piston even though the connecting rod, which extends into the hollow piston rod to a position within the piston, may not always remain in exact alignment with the piston rod.

It has been common practice in the past to surround the skirt end of the piston with a packing which fits within and slides along the wall of the cylinder, and to permit communication of liquid into a depression in the wall of the piston in advance of the packing carried by the skirt of the piston. Such an arrangement materially lessens the contact surface between the piston and the cylinder, and upon the retractile stroke of the piston subjects the packing to a suction or depression which, on occasions, draws air into the recessed portion of the piston, whence it is drawn into the cylinder, causing compressibility of the brake fluid within the cylinder and consequent "springy" foot pedal action. In accordance with my invention, pressure, rather than depression, occurs on the packing around the piston rod at the time fluid passes from the hollow part of the piston into the cylinder.

My invention is illustrated in the accompanying drawing, in which

Fig. 1 is a vertical section through the reservoir, cylinder, piston, and co-operative parts, and Fig. 2 is a diagrammatic illustration of braking mechanism as it is applied to the four wheel brakes of an automobile.

In carrying out my invention, I provide a reservoir 5 cast integrally with a cylinder 6, which extends throughout its length from wall to wall of the reservoir. Within the cylinder is a hollow piston 7, having ducts 8, which extend from the hollow portion of the piston through the head to the face where they are closed by the base of a rubber cup washer 10. The cup washer 10 is held against the face of the piston by a spring 11, the other end of which holds a valve body 12 on a seat 13 formed in the end of the cylinder remote from the piston. The valve body 12 itself carries a valve 14, the head 15 of which is seated against the valve body under the pressure of a light spring 16. The interior surface of the head of the piston 7 is made substantially flat in a plane perpendicular to the axis of the piston forming the seat for a hollow piston rod 18 which extends slidably through a rubber cup washer 19, supported by a cylinder head 20, threaded into an enlargement 21 at the exposed end of the cylinder 6. A retention ring 22 of T-shape cross-section is held between the inner face 23 of the cylinder head and a shoulder 24 formed at the end of the cylinder, the web of the retention ring 22 serving to hold the rubber cup washer 19 in place in the cylinder head 20, and also serving as an abutment for the piston 7 when it is in its normal position. A soft gasket 26 is squeezed between a shoulder of the cylinder head and the exterior surface of the cylinder to prevent fluid leakage.

The interior end of the piston rod is formed with a spherical segment to receive the spherical end 28 of the connecting rod 29 of a diameter considerably less than the bore of the hollow piston rod. The connecting rod 29 is hingedly attached at 30 to the foot pedal 31, which is pivoted at 32 to a fixed part of the automobile frame.

A rubber boot 33 surrounds the exposed part of the piston rod to prevent dust from collecting on the rod where it is wet by brake fluid. The discharge end 34 of the cylinder 6 is connected by piping 35 to four wheel cylinders 36, diagrammatically illustrated, within the four brake drums 37 of an automobile. Each wheel cylinder is provided with a bleeder cap 39 which may be manually opened to let air escape from the master cylinder, piping and the associated wheel cylinder. The reservoir 5 is provided with a filler cap 40 of conventional design.

In the operation of my hydraulic brake mechanism, brake fluid is first poured into the reservoir 5, and one of the bleeder caps 39 is opened. The foot pedal 31 is then depressed and released in a pumping action causing the expulsion of air from the master cylinder, through the piping, and out through the open bleeder cap. Upon successive operations of the foot pedal, brake fluid is drawn into the master cylinder upon the return stroke of the piston because the valve body 12 now is held upon the seat 13 in the end of the cylinder by the pressure of the spring 11, which returns the piston 7 from its actuated to its normal position. During the return stroke of the piston 7, brake fluid, which had passed through the opening 9 into the rear of the cylinder, and into the hollow part of the piston, upon the forward stroke of the piston, now passes through the ducts 8 and around the cup washer 10 and into the working chamber of the cylinder.

Successive strokes of the foot pedal expels all of the air from the cylinder, piping and the wheel cylinders as the bleeder valves are successively opened. When the air has all been expelled, the reservoir 5 is filled to a high level and the mechanism is in condition for its service operation. When the foot pedal 31 is depressed for service, brake fluid passes out of the master cylinder between the valve head 15 and its seat on the valve body 12, pressing the pistons of the wheel cylinders outwardly and forcing the brake shoes, not shown, against the brake drums. Upon the removal of the operator's foot from the brake pedal 31, the retractile springs, not shown, for the brake shoes cause a reverse flow of brake fluid under sufficient pressure to move the valve body 12 off of its seat 13, allowing the brake fluid to flow into the cylinder 6. If the brake pedal 31 is allowed to return to normal rapidly, the spring 11 will move the piston 7 towards its normal position so rapidly that fluid from the wheel cylinders and brake lines cannot supply the demand for fluid within the master cylinder. Under this circumstance, fluid flows from the interior of the piston 7, through the ducts 8, around the piston cup 10, and into the working chamber of the cylinder 6. Fuid which later flows from the wheel cylinders and lines into the master cylinder escapes through the small bleeder opening 17 which extends through the cylinder wall and terminates in the cylinder just in advance of the lip of the cup washer 10. Upon the quick return of the piston 7 from actuated to normal position, pressure slightly above normal is created within the piston 7, thus not only aiding the flow of brake fluid through the ducts 8, but also preventing a negative pressure being applied to the packing cup 19.

Although I have shown and described my invention with respect to certain details of construction, I do not wish to be unduly limited thereto, many variations being possible without departing from the spirit or scope of my invention.

I claim:

In a hydraulic brake mechanism, a cylinder, a hollow piston therein having one end open and the other end closed, a tubular piston rod having a closed end seated against the inside of the closed end of the hollow piston, a resilient guide for the piston rod permitting it to assume alignment with the piston axis, a connecting rod having an end seated against the inside of the closed end of the piston rod within the confines of the piston, and actuating means for the connecting rod causing movement of the external end of the connecting rod out of alignment with the piston rod, the difference in diameters between the connecting rod and the bore of the piston rod being sufficient to prevent the connecting rod from contacting the inner wall of the piston rod by reason of the lateral movement of the actuated end of the connecting rod.

LUDGER E. La BRIE.